United States Patent
Elliott

(10) Patent No.: US 10,830,632 B2
(45) Date of Patent: Nov. 10, 2020

(54) SEALING ARRANGEMENT OF A POPPET VALVE IN A PROVER

(71) Applicant: Edward J Elliott, Tempe, AZ (US)

(72) Inventor: Edward J Elliott, Tempe, AZ (US)

(73) Assignee: FLOW MANAGEMENT DEVICES, LLC, Phoenix, AZ (US)

( * ) Notice: Subject to any disclaimer, the term of this patent is extended or adjusted under 35 U.S.C. 154(b) by 242 days.

(21) Appl. No.: 15/978,055

(22) Filed: May 11, 2018

(65) Prior Publication Data

US 2018/0328778 A1 Nov. 15, 2018

Related U.S. Application Data

(60) Provisional application No. 62/504,725, filed on May 11, 2017.

(51) Int. Cl.
G01F 25/00 (2006.01)

(52) U.S. Cl.
CPC ................................ G01F 25/0015 (2013.01)

(58) Field of Classification Search
CPC .................................................. G01F 25/0015
USPC ............................................................. 73/1
See application file for complete search history.

(56) References Cited

U.S. PATENT DOCUMENTS

| | | | | |
|---|---|---|---|---|
| 3,387,632 A * | 6/1968 | Grove | .................... | G01F 15/005 137/625.43 |
| 4,549,426 A * | 10/1985 | Erickson | ............. | G01F 25/0015 73/1.17 |
| 5,052,212 A * | 10/1991 | Cohrs | ................. | G01F 25/0015 73/1.17 |
| 5,392,632 A * | 2/1995 | Umeda | ............... | G01F 25/0015 73/1.73 |
| 7,650,775 B2 * | 1/2010 | Ignatian | .............. | G01F 25/0015 73/1.19 |
| 8,161,791 B2 * | 4/2012 | Ignatian | .............. | G01F 25/0015 73/1.19 |
| 9,103,709 B2 * | 8/2015 | Brown | ................ | G01F 25/0015 |
| 9,470,573 B2 * | 10/2016 | Ignatian | .................. | G01F 23/60 |
| 2010/0241387 A1 * | 9/2010 | Ignatian | .............. | G01F 25/0015 702/100 |
| 2014/0137628 A1 * | 5/2014 | Rudroff | ............... | G01F 25/0015 73/1.18 |
| 2017/0037922 A1 * | 2/2017 | Takeuchi | .................. | F16F 9/36 |

* cited by examiner

*Primary Examiner* — Peter J Macchiarolo
*Assistant Examiner* — Monica S Young
(74) *Attorney, Agent, or Firm* — Bycer Law, PLC; Matthew L. Bycer

(57) ABSTRACT

A prover includes a piston supporting rod extending longitudinally through a cylinder, which cylinder receives and discharges a fluid to measure the volume and flow rate of the fluid by translation of the piston from the fluid receiving end to the fluid discharging end. Prover valve includes improved poppet valve disk shape that provides for smoother fluid flow, additional volume, and better sealing. Disk also includes angled wings and complimentary poppet seating to provide for better and more resilient seal. Retention ring may be fitted over poppet seal, and includes bolts that provide for removing retention ring to allow servicing of poppet seals (and replacement thereof) while tension remains on prover valve and rod.

21 Claims, 8 Drawing Sheets

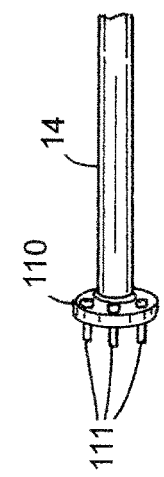
FIG.7
PRIOR ART
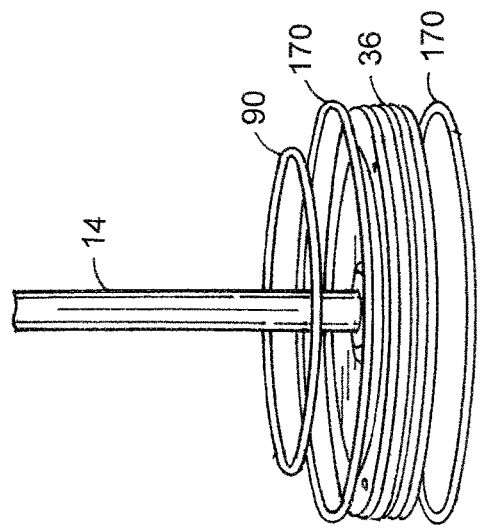
FIG.9
PRIOR ART
FIG.6
PRIOR ART
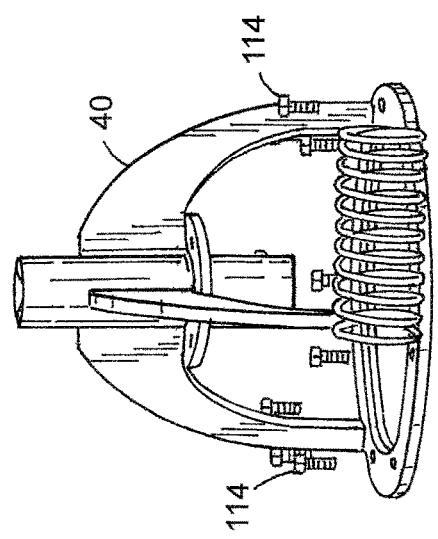
FIG.8
PRIOR ART

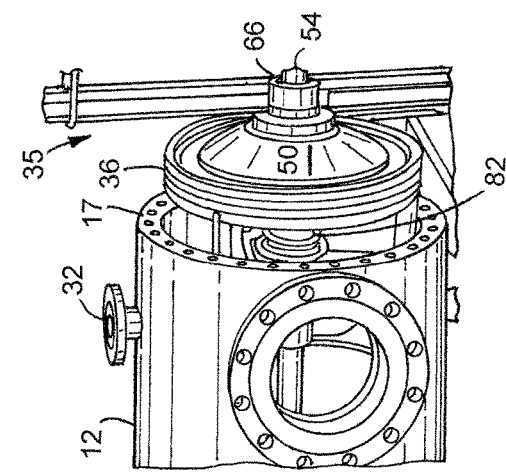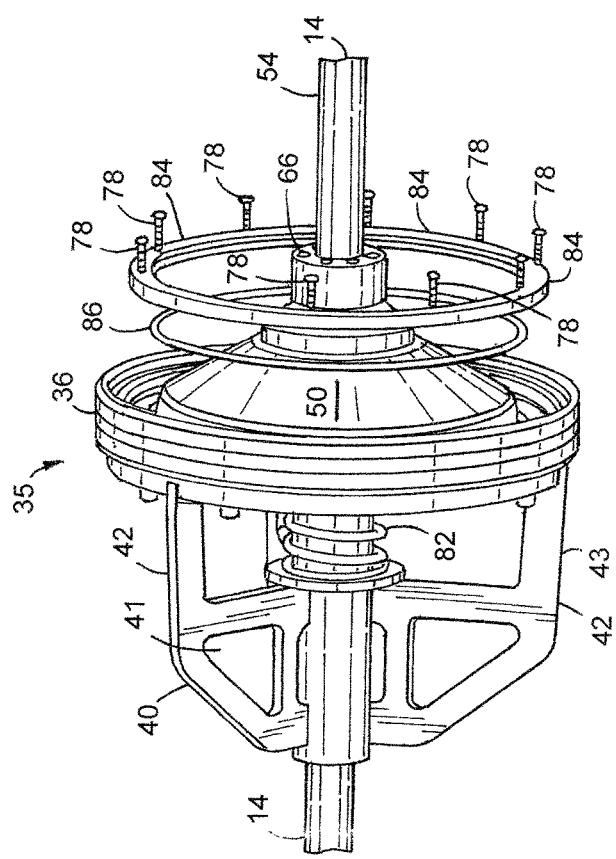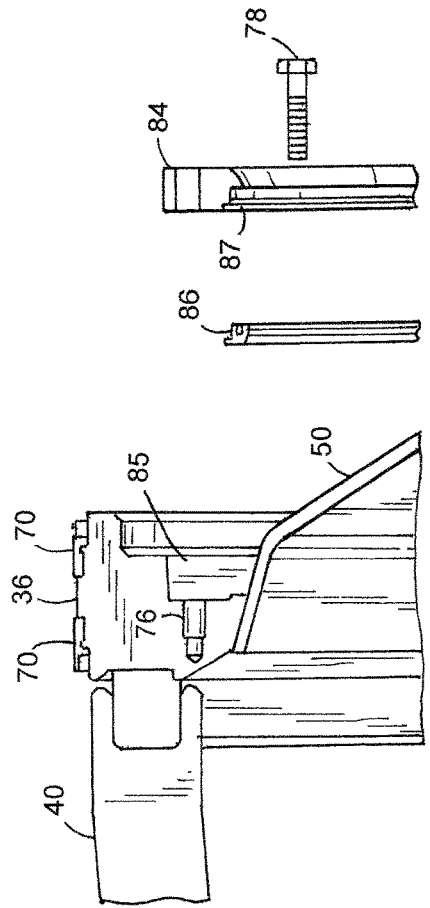

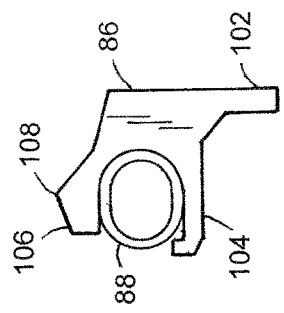
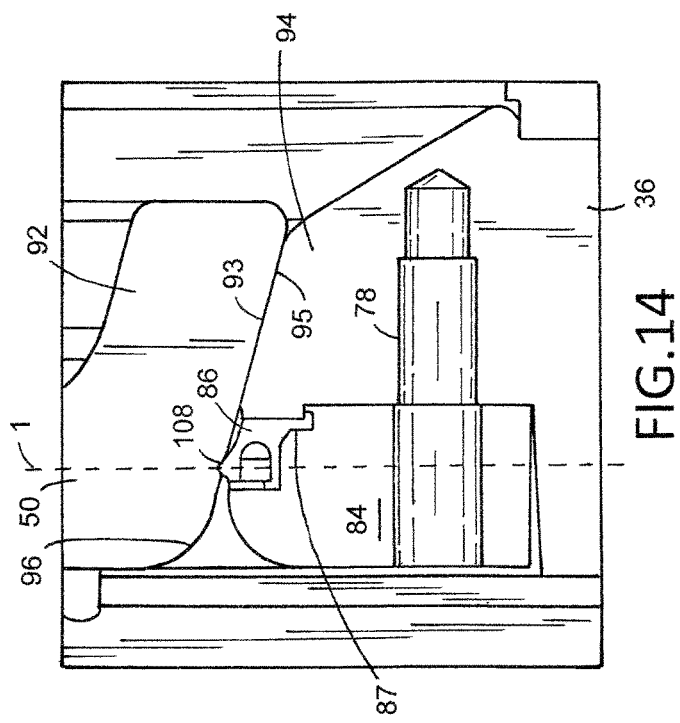
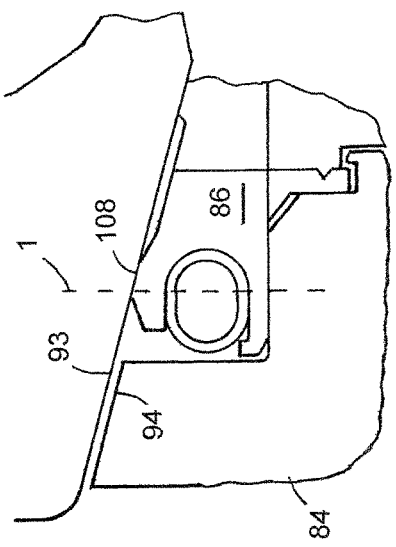

SEALING ARRANGEMENT OF A POPPET VALVE IN A PROVER

CLAIM OF PRIORITY

The present application includes subject matter disclosed in and claims priority to a provisional application entitled "Improved Prover Poppet Design and Seal Retention System" filed May 1, 2017 and assigned Ser. No. 62/504,725 describing an invention made by the present inventor, herein incorporated by reference.

BACKGROUND OF THE INVENTION

1. Field of the Invention

The present invention relates to the field of measuring and testing fluid and more particularly, displacement provers on petrochemical fluid lines.

2. Description of Related Prior Art

The small-volume prover is a compact, cost-effective device that allows users to verify the accuracy of flow meters used to measure product and process materials. A significant small-volume prover in the industry is provided by Flow Management Devices, LLC, such as the invention family represented by U.S. Pat. No. 7,650,775 to Alexander Ignatian. The small-volume prover is used in oilfields worldwide, either on platforms or floating production storage and offloadings (FPSOs) working with varying crude oils, hydrocarbons, and liquid fuels. Flow meters are often proven several times a day, so any reduction in the time taken by the process increases transfer accuracy and significantly improves productivity.

In the stand-by mode the piston is downstream and stationary. The piston's inner flow-through valve is open (valve poppet stationed slightly upstream of the main piston body and coupled with valve), allowing product to flow freely through the prover's measurement cylinder with insignificant pressure loss.

When the operator starts a proving run, the computer signals the motor to pull the piston longitudinally in cylinder into the upstream position. The piston is then uncoupled from the drive return mechanism and valve is closed with the combination of fluid pressure force and spring force. When the piston is released, it quickly accelerates until the piston velocity is now synchronized with the fluid velocity. The low-drag piston traveling down the smooth-bore tube is then free to follow flow of the fluid with the least possible effect on the flow stream from upstream to downstream position within cylinder.

After the piston has been released, and after beginning a short run through the cylinder, the precision optical volume switch is actuated, sending a signal to the proving computer to start the timing sequence. The piston continues downstream with the flow. Upon reaching the end volume switch, a signal is sent to the proving computer to stop the timing sequence. Just after passing the end of volume switch, the piston shaft is stopped by a mechanical stop. Product flowing through the prover pushes the perimeter of the piston further downstream, opening the flow-through valve and permitting flow to continue with little to no pulse/surge in line pressure. The speed, or lack thereof, at which h the opening and closing of the valve affects such surge.

To begin the next proving run, a signal is sent from the proving computer, activating the return mechanism and pulling the piston to the upstream position where it is released to obtain another data point.

The main features of the small-volume prover include its precision smooth bore measurement cylinder, a displacement piston that contains an integral bypass valve and high accuracy optical switches. The bypass valve includes a dual controlled poppet valve resting between a drive rod and a spring. The prover includes preferably PIT filled seals that ensure fluid compatibility, and sealing integrity. The small-volume prover has a constant displaced volume, ensuring constant proving results with uncertainty equal to or exceeding 0.02 percent as required by the American Petroleum Institute (API).

Unidirectional captive displacement provers, such as the FlowMD Unidirectional Captive Displacement Prover provides for small volume proving and sampling of a pipeline. Displacement provers often conform to API 4.2 (American Petroleum Institute). Materials often used include stainless steel and PTFE on wetted parts. Frame mounted isolation pads may provide for lateral drive movement compliance while maintaining vertical support.

Current cylinder draws are limited based on the geometry of the cylinder and the piston assembly. The piston includes a poppet on the integral valve that is fixed on a longitudinally driven shaft. The poppet disk has been a flat, round disk with annular seal. The valve, with poppet, is held in a biased closed position by a spring. The prover valve opens when connected to a flowing fluid stream to allow fluid to continue to pass through the cylinder. On a testing stroke (prover run), the prover shaft drives the piston with open valve via the support through the cylinder towards the supply end (upstream). The piston/shaft assembly is decoupled from the main drive mechanism and the piston system is free to move along the flow direction on shaft via the force provided from the incoming fluid. This allows closure of the valve (as the poppet mates with the seal in valve) via biased spring force and fluid pressure force. At the end of the stroke, the valve opens to allow minimally interrupted flow. During the prover run, the piston assembly moves at the speed of the incoming fluid due to the flow pressure.

The shaft draws the valve and is secured to poppet support to pull piston body. During the opening and closing of the valve, inaccuracies will occur if the closing is not done in advance of the optical volume switch actuation. The practical considerations of the valve being forcibly closed by the incoming fluid pressure and spring tension, causes a delay (however miniscule) that affects flow. Similarly, when opening at the end of the stroke. To minimize the interference caused by the valve action, the valve must open and close as quickly as possible with as little disruption to the fluid dynamics as possible.

Given the nature of the stresses on the prover (designed as a pressure vessel), the components are often very well constructed and do not yield to maintenance easily. Seals wear and ultimately fail due to the (albeit minimized) constant friction and/or pressures on the seal body. These seals must be replaced on a regular basis. In order to replace the seal, prior art provers require complete disassembly of the valve. An improved valve design may include new poppet and seal structure.

Therefore, it is an object of the present invention to provide for an improved geometry in poppet shape to allow for better flow when the valve is open.

It is another object of the present invention to provide a poppet shape that speeds the opening and or closing of the valve after the downstroke and/or the upstroke, respectively.

It is yet a further object of the present invention to increase the pressure on the valve to streamline poppet valve closure at the beginning of the downstream stroke.

It is yet another object of the present invention to minimize the time to open the valve at the end of the downstream stroke.

It is an object of the present invention to provide accurate flow readings.

It is another object of the present invention to reduce noise in the system.

Furthermore, the current poppet geometry including retention rings and support frame lead to difficult maintenance and repair. It is therefore another object of the present invention to provide for an improved ring seal removable for easier maintenance of poppet and valve. A prior art prover includes a piston body includes a piston support, poppet, upstream a shaft and downstream shaft, retainer washer, seal rider, piston spring, bushing, piston seal and poppet seal, etc. An improved design can simplify the parts to accommodate case of maintenance.

It is a further objective of the present invention to provide for an easily accessible seal.

It is a further another object of the present invention to provide for ease of maintenance of a prover valve.

These and other objects of the present invention will become apparent to those skilled in the art as the description thereof proceeds.

SUMMARY OF THE INVENTION

The present invention includes a small-volume prover for the validation and monitoring of petrochemical fluid flow. A cylinder houses an upstream shaft and a downstream shaft, and includes a valve supported between the upstream and downstream shafts. In the alternative, a single shaft may be used to support the valve. The valve includes a poppet (such as a disk) and a poppet valve seat along an interior surface of the valve. The seal along the valve ring defines a ring plane where the poppet valve seat meets the poppet. The poppet mates the poppet valve seat at an angle offset from parallel of said ring plane. The angled meeting of the poppet and ring contrasts prior parallel matting of straight edges against a straight (parallel) flange.

The poppet is preferably angled and mates with complimentarily angled seat. The poppet may be many shapes, including a contoured poppet disk. The poppet disk may be contoured in such a way that at least a portion of the contoured poppet disk extends downstream beyond the ring plane. A spring forcing the poppet disk may also extend downstream beyond the ring plane. Given the contour of the poppet disk, the disk may take up enough length along the cylinder that at least a portion of the contoured poppet disk extends upstream beyond the ring plane at the same time as the disk is also beyond the ring plane in the downstream direction.

The poppet disk may be either flat or contoured, while including an angled wing along the annular edge or circumference of the disk. The angled wing mates with the poppet valve seat and provides for poppet mating (and seal) with the seat at an angle offset from parallel of the ring plane.

The small-volume prover may include a poppet seal (such as an annular seal, cup spring seal, etc.) mounted onto the poppet valve seat. A removable retention ring may be used to fasten the poppet seal onto the poppet valve seat. The disk may be contoured and include an annular ring, whereby the poppet seal is adapted to provide mating with the annular ring of the disk. A retention ring may be fastened directly to the poppet valve seat. The retention ring may be fastened by fasteners, such as threaded bolts, screws, snap rings, etc.

The invention also includes a small-volume prover with a cylinder housing an upstream shaft and a preferably a downstream shaft. A support slidably encircles the upstream shaft and includes a spring slidably mounted on the upstream shaft. A valve is located along the shaft, said valve comprising a contoured poppet in force communication with said spring. The contoured poppet may include an interior sheet section circumscribed by an annular wing. The interior sheet may be formed, conical, flat, tapered, or otherwise. The valve may include a tapered poppet valve seat angled at an offset angle greater than zero degrees from a ring plane. The seat may be angled to complimentarily mate with the annular ring of the contoured poppet. The annular wing may include a tapered angle to match the offset angle. The annular wing may include a sealing face adapted to mate with the poppet valve seat or a seal emanating or flanged on the seat. The annular wing may preferably includes a thickness greater than a length of a contact surface on the poppet valve seat. Thus, as the annular wing wears, the location of the seal at the seat may be modified while retaining a possible seal in angled mating faces. The present invention also includes a method of maintaining the poppet seal in a small volume prover. One may remove the prover cylinder end flange to access the valve within the cylinder. The poppet valve assembly may be maintained within the prover cylinder, and need not be removed to access the valve and seal(s). Both upstream and downstream shafts may remain in place, along with spring-loaded pressure against the poppet. A retention ring may be removed from the ring to access a poppet seal from between the valve ring and the retention ring. One may thereby replace the poppet seal while the valve remains on both upstream and downstream shafts, and then retain the poppet seal by replacing the retention ring over poppet seal onto the ring.

BRIEF DESCRIPTION OF THE DRAWINGS

The present invention will be described with greater specificity and clarity with reference to the following drawings, in which:

FIG. 6 illustrates a perspective side view of the prior art piston valve;

FIG. 7 illustrates a side perspective view of the downstream rod and attachments of the prior art;

FIG. 8 illustrates a partially exploded view of the prior art valve and attachment mechanisms;

FIG. 9 illustrates a side view of the prior art piston valve with seals exploded;

FIG. 10 illustrates an exploded view of the piston of the present invention having seal and retention rings with bolts;

FIG. 11 illustrates a side perspective view of the poppet valve jutting through a cylinder with end open;

FIG. 12 illustrates a partially exploded cross-sectional view of the poppet and ring seal;

FIG. 14 illustrates a close-up cross-sectional view of the retention ring as applied with poppet valve in closed position in reverse view;

FIG. 15 illustrates an alternative closeup cross-sectional view of poppet seal and seat including seal spring;

FIG. 16 illustrates a partial cross-sectional view of poppet seal including seal spring;

DESCRIPTION OF THE PREFERRED EMBODIMENT

Figure 1:
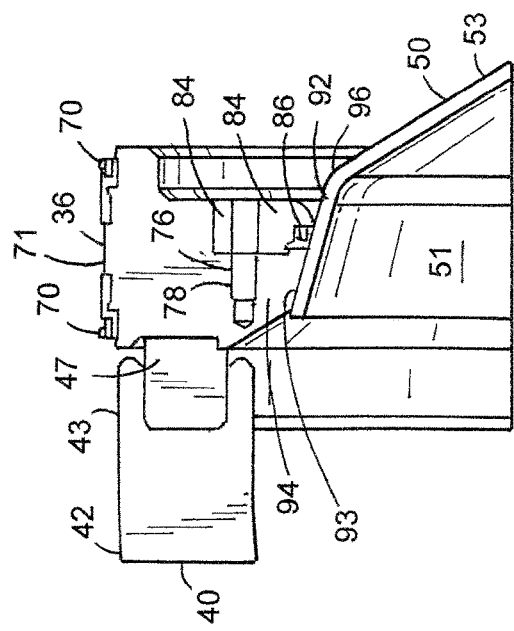
FIG. 1 illustrates a side view of the poppet valve as situated within the cylinder when valve is in closed position.

Numerous patents have issued disclosing various types of provers. In the present invention, provers such as those described and taught by U.S. Pat. Nos. 7,650,775, and 8,161,791 to Alexander Ignatian are herein incorporated by reference. The present invention also builds upon the improvements to provers set forth in U.S. Pat. Nos. 8,196, 446, 8,205,479, 8,578,752, 8,677,800, 9,103,709, and 9,470, 573 to Alex Ignatian herein incorporated by reference.

A small volume prover improved with optimized drive belts includes a piston designed to displace sampled material in flow tube. Improved design of piston, including a valve with contoured poppet, allows for smoother fluid flow due to the efficiency of space when the valve is open. The redesigned poppet contoured shape provides for increased volume sampled as the poppet may close more quickly, more fluid remains on upstream side, as well as providing for possibility of reduced tube size. The new poppet structure and design includes any angle greater than 0 degrees measured perpendicular to flow direction, such as to reduce the angle fluid can flow over the open valve poppet to less than ninety degrees. The valve is held in place by a spring mated with a support and the upstream side of the poppet disk. The valve includes a ring in communication with the interior surface of the cylinder to provide a seal. The ring includes a ring plane perpendicular to flow and direction of cylinder that dissects the cylinder. The poppet is contoured such that the downstream face of the poppet disk extends further downstream than the ring plane. Furthermore, the spring mating with an upstream face of the poppet disk may be moved (at least partially, if not fully) downstream beyond the ring plane, thus utilizing more of the available volume within the cylinder.

A seal retention ring may be applied to valve body, including fasteners onto structure support to provide access to seal(s). The seal retention ring may be placed on the downstream face (near interior) of ring to hold a seal on poppet seat to allow poppet to seal in ring (and close valve).

Improved dish-shaped, or contoured, poppet may provide potential benefits of decreasing mass of poppet and prover, decreasing cost of materials and manufacture, and reducing pressure loss due to improper geometry of flow profile. Contoured poppet provides improved flow profile for smoother flow and less pressure loss. Improved poppet and ring provides for easier handling design. Poppet and ring assembly includes less material volume and should be lighter to handle manually. Efficient compact piston design provides for space efficiency. With the new poppet design, more volume can be sampled or the prover may be shortened.

The improved poppet and design seal allows for the prover to flow more smoothly through the proving stroke. The valve remains open for fluid to pass through during normal operation of the flow meter. Flow passes over poppet design in valve within prover cylinder. In order to start a test run, rod drives valve upstream through fluid towards the inflow end of cylinder. As quickly as possible, rod is released from drive system allowing valve to close, in part due to pressure flow against the poppet. Valve is allowed to flow longitudinally through cylinder to demonstrate the speed of the flow. At the end of the stroke, as valve has now moved downstream within cylinder, the valve will reopen to allow flow to continue. Disruptions upon valve closure and opening can impact readings of flow, as well as cause possible cavitation leading to unwanted noise and vibrations in the prover. At end of upstream stroke, the improved poppet design can utilize more flow pressure to close the poppet faster. The sooner closure the sooner a measure can be taken. This allows the measurement cycle to be completed over a longer period of time (greater volume). By doing so, more of the stroke can be used, such as at the end of the upstream stroke and the beginning of the downstream stroke as the valve is closed the instantaneous release of pressure from the rod and spring will close the valve as it is beginning its movement downstream. The faster the closure of the valve, the more length of the cylinder can be used for testing.

Figure 2:
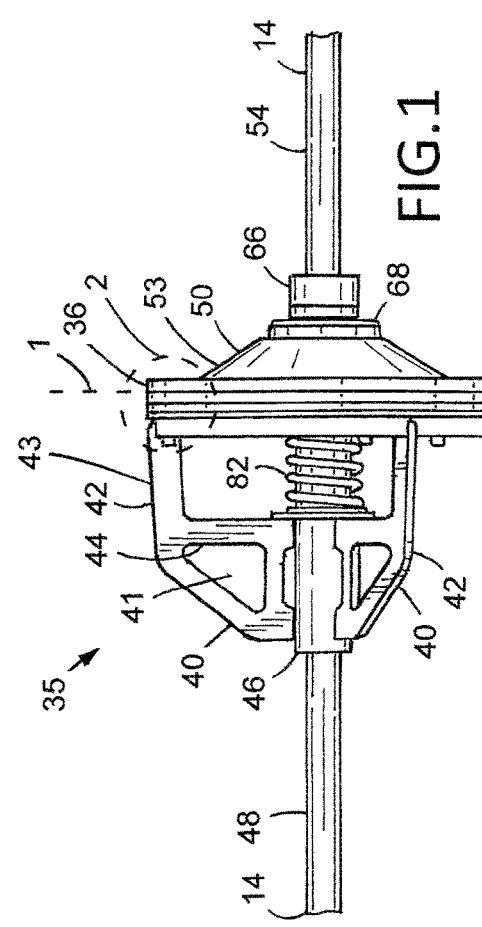
FIG. 2 illustrates a closeup cross-sectional view of the poppet and disk interfacing with the ring.

Referring now to FIGS. 1 and 2 of the improved piston design, FIG. 1 demonstrates a poppet valve as may be used in a piston within a cylinder of a prover of the present invention. Rectilinearly translatable piston with a poppet valve will be disposed within cylinder to form piston mounted on rod 14 (or between rod sections). As can be seen, poppet valve 35 is set along a rod 14. Piston includes support 40 mounted on rod 14 via slidably encircling sleeve 46. Support 40 includes support arms 42 mounted along sleeve 46 and reaching ring 36. Each of support arms 42 (preferably three equally angular around rod 14, separated by one-hundred-twenty degrees) includes aperture 41 to ensure a lightweight structure. Ring 36 defines ring plane 1 which dissects cylinder (not shown) at the plane of sealing when valve is closed. Support arm 42 includes both parallel support bars 44 and perpendicular section 43. It is preferable that support 40 interfaces with ring 36 at a right angle (as shown). Perpendicular sections 43 run parallel with cylinder and general nature of fluid flow through prover.

Poppet valve is further coupled with support 40 via spring 82 which interfaces with disk 50 (shown in FIG. 1 as preferred embodiment with contoured form). Rod 14 may be comprised of multiple sections, including further rod section 54 shown downstream. Further rod section 54 interfaces with forward hub 66 and disk support front 68 which mounts on the downstream surface 53 of disk 50.

As can be seen with more detail in the closeup cross-sectional view of FIG. 2 (identified in FIG. 1 by circle 2), support 42 engages ring 36 on upstream side (left, as shown) of ring. Perpendicular support section 43 may be mounted onto mounting structure 47 of ring 36. It is contemplated that mounting section 47 is an annular flange extending perpendicularly from the entire ring 36. On circumferential edges 71 of ring 36, annular seal rings 70 provide for contact with cylinder (not shown) to provide a seal to ensure that all fluid flow is either stopped when piston is closed, or flows along piston, as is known in the art. Particular to this improved poppet design, disk 50 is shown in a contoured shape to reach ring 36 at an angle offset from ring 36. Disk 50 includes interior surface 51, and exterior surface 53. It is contemplated that when poppet valve is closed, as is shown in FIG. 2, upstream flow provides a force against disk surface 51, while remaining material/fluid in the downstream section exerts a potentially somewhat lower pressure against downstream disk surface 53. Spring 82 may be used to balance forces on poppet disk to ensure valve closure. Disk 50 includes wing 92 that is formed after bend 96. It is contemplated that in most preferred embodiments, bend 96 causes the contoured shape of disk 50 in further perpendicular angle relative ring 36 and ring plane 1. Poppet disk 50 is contoured such that the disk extends beyond the ring (in the downstream direction as is shown). Wing 92 includes wing engagement surface 93 on the exterior of poppet. Wing engagement surface 93 interfaces with ring seat 94. Ring seat 94 is preferably a flange with angled interface surface on interior of ring 36. A cup spring seal 86 (preferably an annular sealing surface) is held in place by retention ring 84. Retention ring 84 is placed over cup spring seal 86 and held in place via bolts 78 into apertures 76. It is preferred that bolts 78 are threaded and mate with an interior threaded surface of apertures 76 within ring 36. Alternative fastening means may be used, including snap rings, etc. as is known in the art for attaching a ring along a seat.

Figure 3:
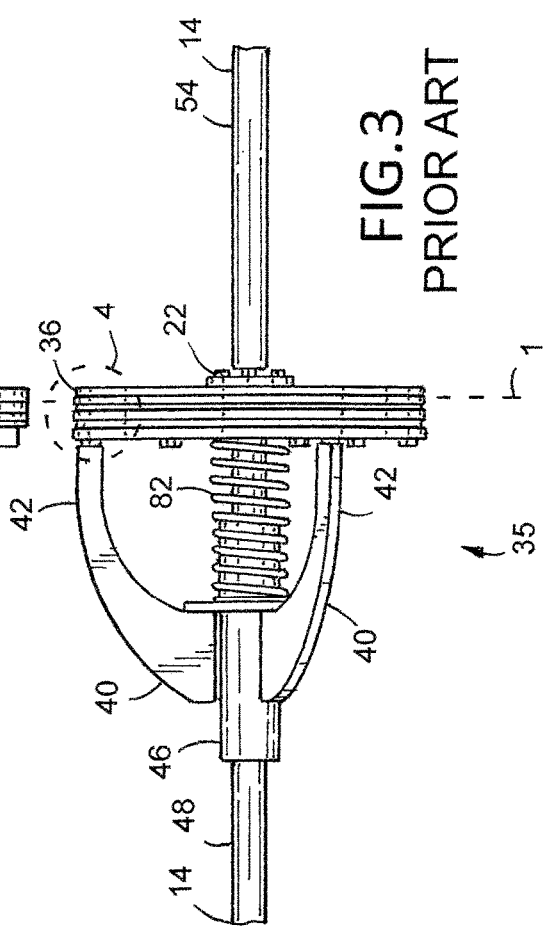
FIG. 3 illustrates a side view of the prior art piston valve within a cylinder.
Figure 4:
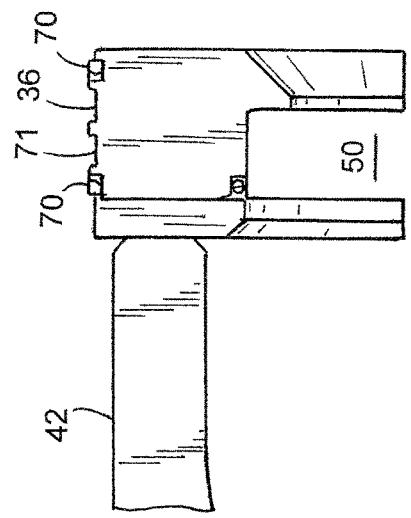
FIG. 4 illustrates a cross-sectional view of the prior art poppet seal against the ring.

Referring now to the prior art shown in FIGS. 3 and 4, piston would include poppet valve as is shown. Poppet valve rests on rod 14 including upstream section 48 and downstream section 54. Similarly, a sleeve 46 will be used around rod to hold support 40 with support arms 42. Support 40 engages ring 36 as is known in the art. Furthermore, securing means 22 is used in center of disk (not shown) such that disk can only be accessed via securing means 22, and the seal along ring 36 cannot be accessed unless tension in spring 82 is relieved. As can be seen more particularly in FIG. 4, disk 50 is held against ring 36 without use of the retention ring of the present invention. The type of spring 82 used in both the improved embodiment shown in FIG. 1 and the prior art valve of FIG. 3 may be similar in size and length. As can be seen in FIG. 1, a portion of the spring 82 is occluded by ring and disk, and the downstream end of spring 82 is joined with disk surface 51 whether at plane 1 or downstream (further right) of plane 1. Thus, by contouring poppet disk. 50, the size and length of the support 40 is greatly reduced. Sleeve 46 in FIG. 1 is moved quite a bit to the right/downstream, reducing length of arms 42.

Figure 5:
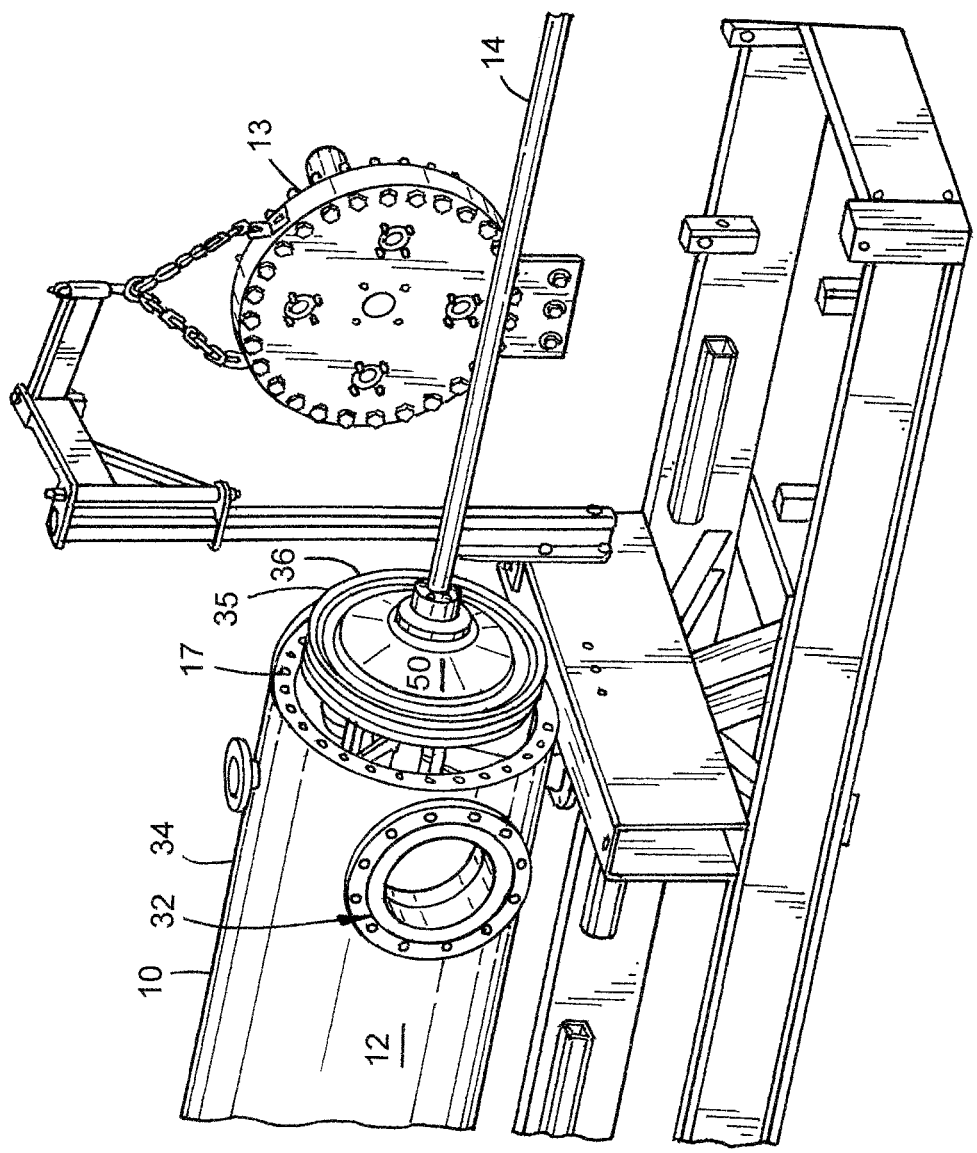
FIG. 5 illustrates a perspective view of the piston seal within the cylinder having cylinder end removed for service.

As can be seen in FIG. 5, prover 10 may be opened by accessing piston 34 through open end 13. Cylinder 12 includes piston 34 which is made with poppet valve 35. Ring 36 interfaces an interior surface of cylinder 12. Outlet 32 provides for flow outlet of the prover. End 13 engages cylinder 12 via cylinder mating bolts. Prior art is further shown in FIGS. 6-9 demonstrating the poppet valve of the prior art utilizing a flat disk held via spring tension into poppet valve. Supports 40 engage ring 36 while spring 82 provides pressure to disk 50. Rod 14 includes front hub 110 held in place on disk via fasteners 111. In these embodiments, support 40 is mounted onto ring 36 via support fasteners 114. Annular seals 170 provide for seal against interior cylinder surface, while poppet seal 90 is placed around location of poppet in ring 36.

Referring now to an exploded view of poppet valve 35 of an embodiment of the present invention shown in FIG. 10, poppet valve 35 rests along rod 14. Support 40 includes apertures 41 and horizontal sections 43 along arms 42. Spring 82 provides force to hold and move poppet disk 50 relative to ring 36 (to open/close valve). As shown disassembled, retention ring 84 may be removed from ring 36 via release of fasteners 78. By removing retention ring, one may access cup spring seal 86. As can be seen, further rod section 54 maintains its position relative disk 50 via forward sleeve 66 without need to relieve tension on spring 82 for maintenance and access to cup spring seal. In this way, cup spring seal may be removed and replaced with little or no disassembly of prover. Furthermore, should maintenance or machining be required at the seal between disk and ring, one may access the interface without altering ring plane 1. As can be seen in FIG. 11, cylinder 12 includes outlet 32. Ring 36 can be accessed by removing the end of the cylinder by disassembling at mounting bolt apertures 17 to access disk 50 and ring 36 of poppet valve 35.

A cross-sectional exploded view of a portion of alternative embodiment of the poppet disk engaging a surface of an alternative ring (similar to view area of embodiment shown in FIG. 2) is shown in FIG. 12. Support 40 mounts into ring 36. Ring 36 includes annular seal ring 70 on the circumferential exterior to engage cylinder interior surface. Apertures 76 are shown for engagement with bolts 78 to secure retention ring. Cavity 85 provides space for retention ring 84 to be bolted onto ring system. Cup spring seal 86 fits into cavity 85 and is held in place by retention ring 84 against ring 36. Retention ring 84 includes groove 87 to accommodate cup spring seal. When assembled, disk 50 interfaces with ring and cup spring seal to form a tight seal. While FIG. 12 demonstrates cutaway cross-sectional portions, it should be considered that cup spring seal, retention ring, and ring are all annular (preferably circular) structures with portions shown thereof.

Figure 13:
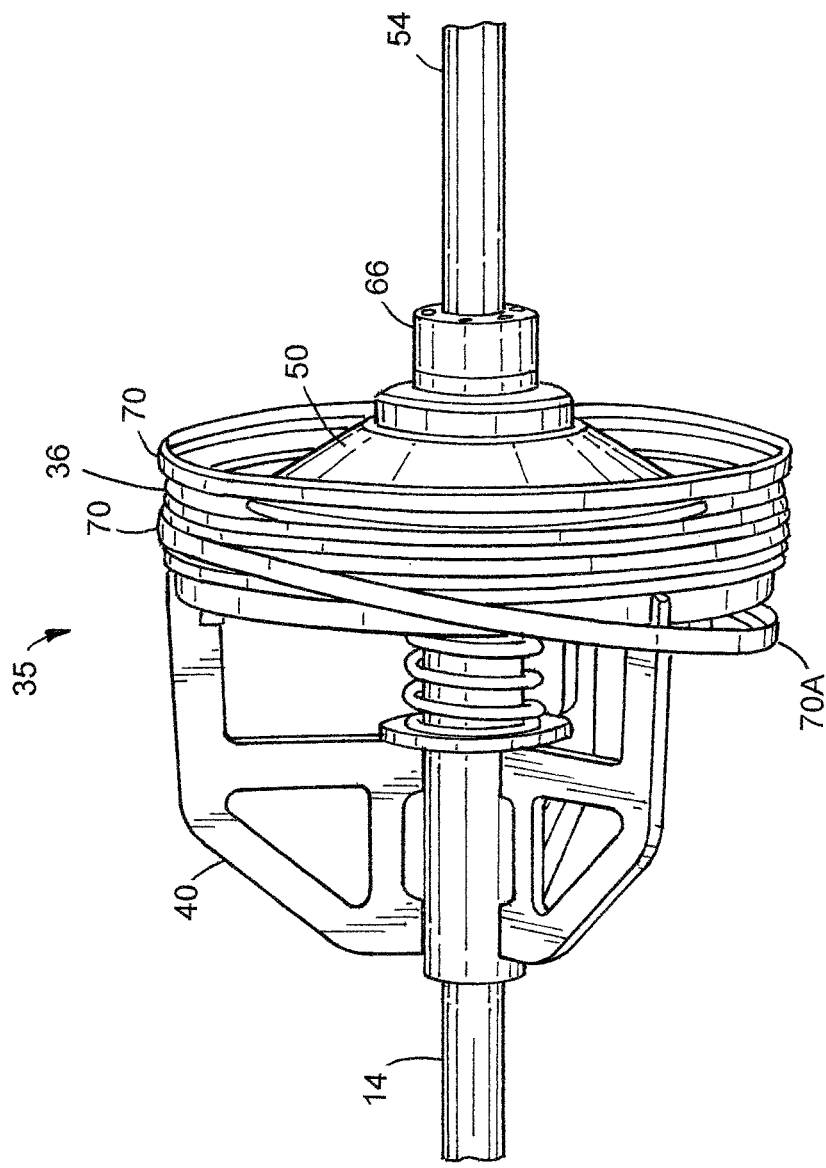
FIG. 13 illustrates a perspective side view of the poppet valve of the present invention with exterior annular seals displaced.

As can be seen in FIG. 13, poppet valve 35 is shown on rod 14 mounted via support 40. Ring 36 includes annular seal ring 70 which may be serviceable when poppet valve is removed from cylinder 12. Here annular seal ring 70A is shown slightly removed for service/replacement. Disk may remain mounted into ring 36 when accessing annular seal ring 70. Further rod section 54 remains mounted via forward sleeve 66 onto the face of disk 50.

As can be seen with particularity for the seal, in FIGS. 14-16 (bottom and reversal of direction from FIG. 2), an embodiment of the present invention is shown with facing surfaces of the poppet mate to form a seal at ring plane 1. Disk 50 includes bend 96 whereby wing 92 may form around the circumferential edge. It is contemplated that wing 92 is set at an angle offset from ring plane 1 to provide a mating surface 93 against ring seat 94 with facing surface 95. Retention ring 84 is held in place via bolts 78. Retention ring 84 holds cup spring seal 86 within ring seat 94. Cup spring seal 86 includes flange 102 held in place into retention ring groove 87. Cup spring seal includes further backing arm 104 and interface arm 106 as is known in the art. Interface arm 106 further includes a ridge 108 for direct contact and extra sealing pressure against disk engagement surface. Cup spring seal 86 may also include a support spring 88 that forms an annular tube that ensures cup spring seal has additional rigidity when disk interfaces with ring to seal valve. Given the angle at which wing and disk interface with ring 36 (offset from parallel interface of prior art), as disk is worn, the seal can remain in place over multiple uses as the disk merely rests in a slightly removed portion. The advent of an angled disk facing surface provides for much longer life of the piston. The disk or ring mating surfaces may at times form defects which have to be repaired. In the prior art, if the mating edge of the ring formed a defect, one could not machine away a portion of the disk and thereby make the diameter shorter, as it would no longer fit into the ring. However, with the angled interface, should the disk or mating surface include any defects, one may simply machine away portions of the disk and/or ring and modify the spring loaded location of the disk to provide a seal against the ring. After machining, tension and length of spring 82 (not shown) may be adjusted accordingly due to minimal move of disk position when valve is sealed.

As can be shown in FIGS. 17-20, flow diagrams of the prover in use demonstrate the utility of the present invention. Poppet valve 35 is shown along rod 14. Flow indicated by arrows 120 provides a visual indicator of expected fluid flows through poppet valve 35. When certain poppet disk shapes are used, flow is modified through system. By minimizing the amount of turbulence, and subsequent noise, in the system, the prover is much more useful and stable when in use. Excessive noise can cause rattling and modify measurements and otherwise wear on the prover. The current contoured poppet disk shapes provide maximum benefit. The spring (not shown) can be held up against disk 50 and exist in the quiet zone 121 where flows are at a standstill due to equilibrium flowing pressures. Disk 50 is preferably contoured such that an angle is formed on disk. Preferably, the angle is set at forty-five degrees off of rod 14 when mating against face 66. The angle at which contoured poppet forms relative to ring plane 1 may be anywhere between ten- and eighty-degrees relative rod and/or ring plane, as is known in the art to provide for a contoured shape of disk. Disk may include a conical shape, bell shape, convex, elliptical, hemispherical, or otherwise include a varying angle (including curvature/varying angle or contours), tapering, etc. to provide for these advantages. Disk wing 92 preferably forms at a shallower angle relative rod (sharper angle relative ring plane 1) than disk coming off of forward sleeve 66 and interfaces within ring seat 94.

Figure 17:
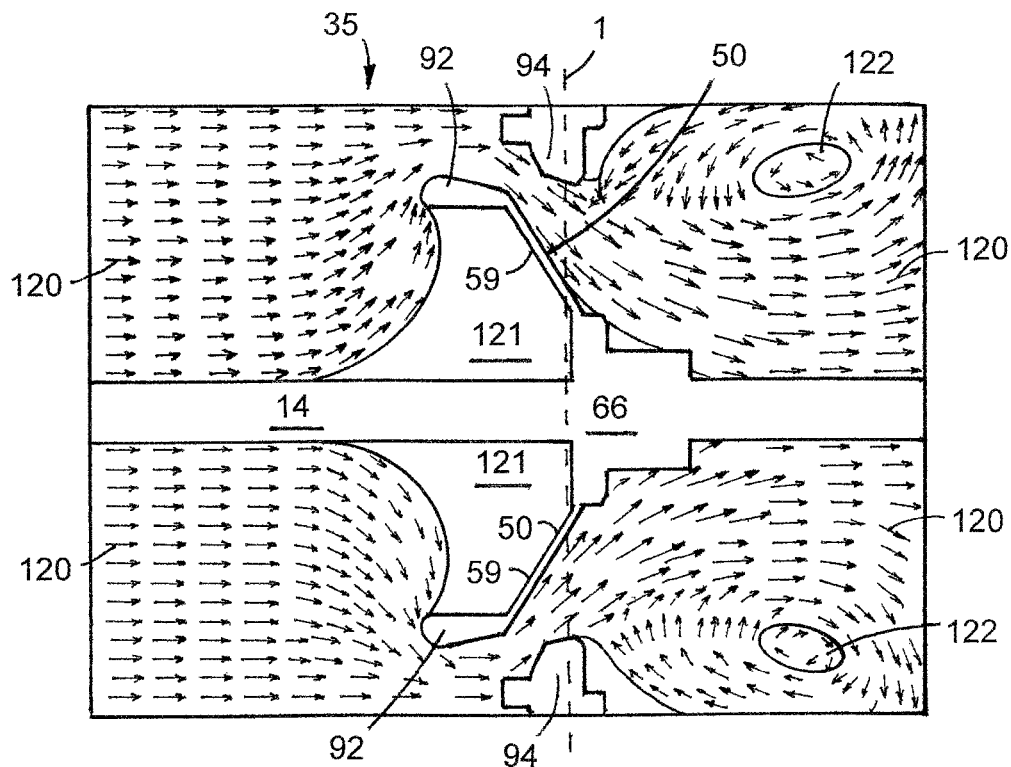
FIG. 17 illustrates a side cross-sectional view of poppet piston of the present invention with fluid flow diagram.

A further advantage of the present invention is demonstrated in the cross-sectional view of the embodiment shown in FIG. 17. Disk wing 92 may be much thicker than disk sheet 59. Wing 92 includes additional material to allow for machining of wing 92 whereby, due to the angle of interface with seat 94, disk wing 92 may be worn and/or machined down, over time, so that disk does not need to be replaced when servicing surfaces of disk and/or seat. Disk sheet may be a very thin section of disk 50 to provide for the benefits of light weight and small volume. The thickness of sheet 59 relative to the thickness of sheet 69 shown in FIG. 18 demonstrates the possible savings in material (and thereby weight).

Figure 18:
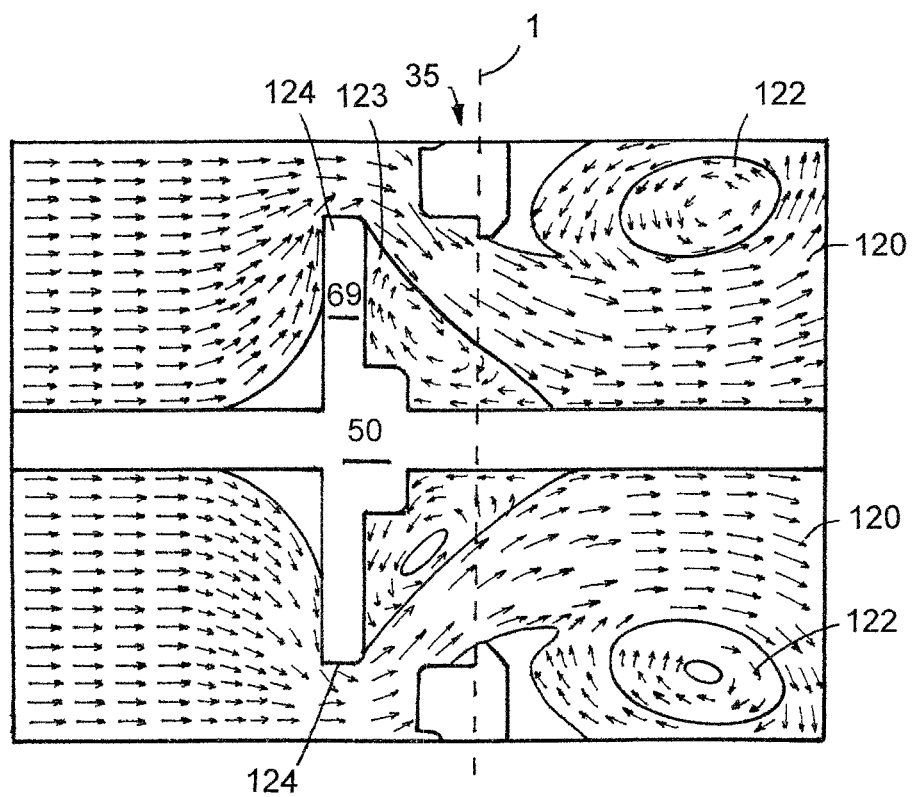
FIG. 18 illustrates a side cross-sectional view of poppet piston of the present invention with fluid flow diagram of the prior art.

As is shown in contrast of FIG. 18 demonstrating a cross-sectional flow view of the prior art, additional areas of secondary circulation 122 is shown. Additionally, turbulent zones 123 form due to the hard angle 124 of fluid flows over the edges of disk 50.

Figure 19:
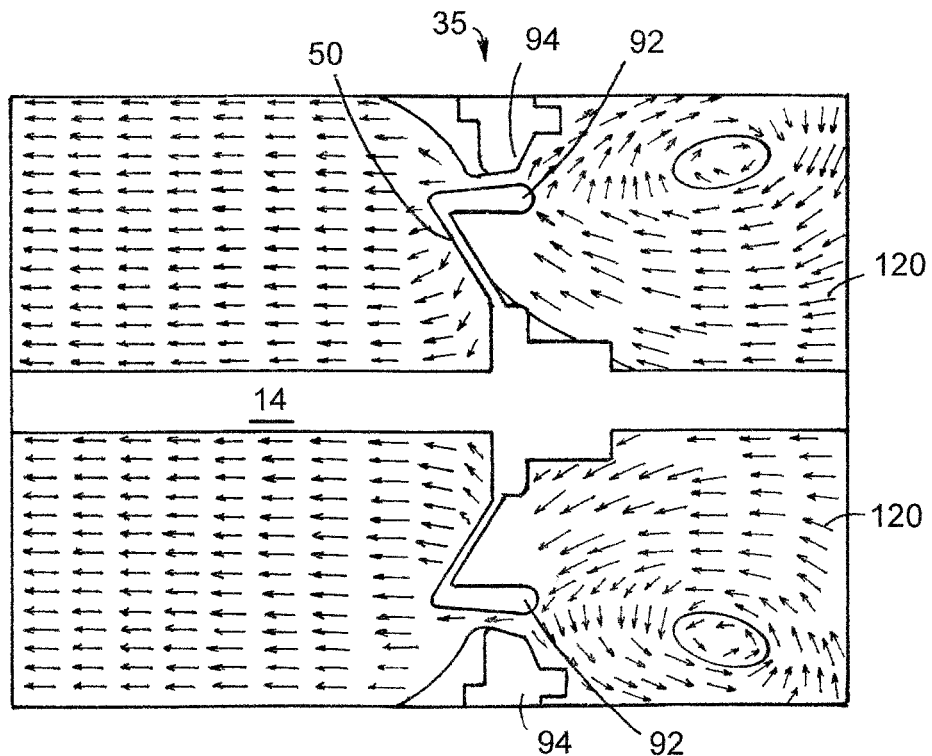
FIG. 19 illustrates a side cross-sectional view of an alternative embodiment of the improved poppet seal.
Figure 20:
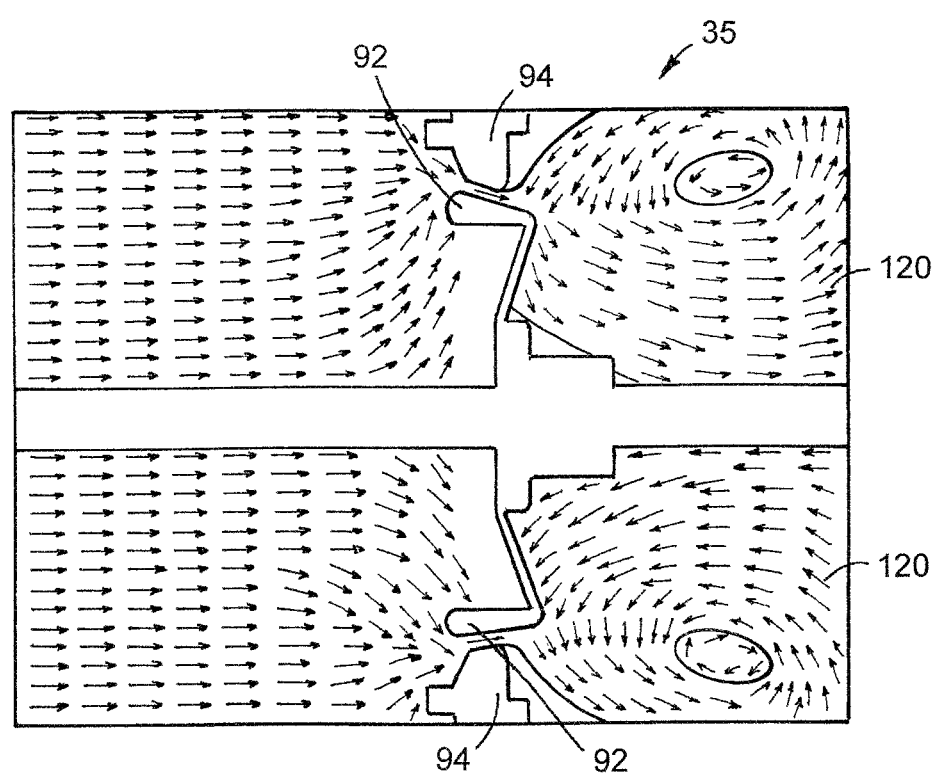
FIG. 20 illustrates a side cross-sectional view of an alternative embodiment of the improved poppet seal.

Alternative embodiments of the present invention are demonstrated in FIGS. 19 and 20. Disk may include varied angles off of rod 14 and will mate with complimentary surfaces in seat 94. Fluid flows may be provided through prover in multi-direction in certain embodiments of provers known in the art. Disk angles and geometries may be modified utilizing the same concept of the present invention to provide an angled mating surface, a contoured disk, and a reinforced wing. These and other embodiments embodying the invention set forth may utilize these concepts for the improvements to provers.

Poppet is preferably in accordance with one embodiment of the present invention a 3/16ths inch fixed stainless steel. Poppet may be manufactured into the shape or conically popped from a sheet. Manufacture of poppet can reduce the current poppet volume (e.g. by approximately 75% and/or reduction in mass of approximately 75%). During seal replacement maintenance, support can remain bolted to spring, and provides compression on spring. Retention ring may be pulled off and valve providing access to seal and poppet without removing mount support from spring. Fasteners for ring may include screws, possibly with a thread locker (glue). Seal may be comprised of reinforced Teflon PTFE or UHMW, or otherwise.

The new designed poppet may be any concave shape rather than a flat shape of the current valve disks. The slope on the edges of the poppet may provide for a smoother flow velocity to provide less cavitation, and/or to provide less noise in system.

I claim:

1. A small-volume prover for the validation and monitoring of petrochemical fluid flow, said prover comprising:
   a cylinder housing an upstream shaft and a downstream shaft;
   a valve supported between said upstream shaft and said downstream shaft, said valve comprising:
      a poppet valve seat along an interior surface of said valve;
      a poppet seal mounted onto said poppet valve seat and a retention ring fastening said poppet seal onto said poppet valve seat;
      a ring plane along said poppet valve seat where said poppet valve seat meets a poppet mounted on said valve, said poppet mating said poppet valve seat at an angle offset from parallel of said ring plane.

2. The small-volume prover of claim 1 wherein said poppet comprises a contoured poppet disk.

3. The small-volume prover of claim 2 wherein at least a portion of said contoured poppet disk extends downstream beyond said ring plane.

4. The small-volume prover of claim 3 wherein at least a portion of said contoured poppet disk extends upstream beyond said ring plane.

5. The small-volume prover of claim 2 wherein said retention ring is fastened to said poppet valve seat via a snap ring.

6. The small-volume prover of claim 1 wherein said poppet seal comprises a cup spring seal.

7. The small-volume prover of claim 1 wherein said cup spring seal comprises a support spring.

8. The small-volume prover of claim 1 wherein said poppet comprises a poppet disk, said poppet disk comprising an angled wing along said poppet disk circumference.

9. The small-volume prover of claim 1 wherein said angled wing mates with said poppet valve seat and provides for said poppet mating said poppet valve seat at an angle offset from parallel of said ring plane.

10. The small-volume prover of claim 1 further comprising a contoured poppet disk comprising an annular ring; and said poppet seal is adapted to provide mating with said annular ring.

11. The small-volume prover of claim 1 further comprising a retention ring attached by fasteners to said poppet valve seal.

12. The small-volume prover of claim 11 wherein said retention ring is fastened to said poppet valve seat via removable threaded fasteners.

13. A method of maintaining the poppet seal in a small volume prover comprising the steps of:

a. removing a prover cylinder end flange to access a poppet valve within the cylinder;
b. maintaining the poppet valve assembly within the prover cylinder;
c. during maintenance on a poppet seal, maintaining contact of the poet valve with spring loaded pressure against the poppet value;
d. removing a retention ring attached to the downstream side of the poppet to access a poppet seal from between the valve and the retention ring;
e. replacing the poppet seal while the poppet valve remains on both upstream and downstream shafts;
f. retaining the poppet seal onto the poppet valve seat by replacing the retention ring over the poppet seal onto the poppet valve seat.

14. The method of claim 13 wherein said steps of removing and replacing are conducted on a cup spring seal poppet seal.

15. The method of claim 14 wherein said step of replacing comprises holding the poppet seal in the retention ring at least via a flange of the poppet seal.

16. The small-volume rover of claim 1 wherein said poppet valve seat meets a wing around said poppet valve; and said wing comprising a body set along a circumferential edge of said poppet, said wing coupled to said poppet via a bend at said poppet circumferential edge.

17. The prover of claim 16 wherein said poppet disk comprises a contoured shape.

18. The prover of claim 17 wherein said poppet disk contoured shape forms a first angle offset said ring plane, and said wing forms a second angle offset said ring plane, said first angle less than said second angle.

19. The prover of claim 16 further comprising a poppet seal retained to said poppet valve seat via a retention ring.

20. The prover of claim 19 wherein said poppet seal comprises a cup spring seal.

21. The prover of claim 19 wherein said retention ring comprises a groove, and said poppet seal comprises a flange set within said groove.

* * * * *